(12) United States Patent
Wiggerich

(10) Patent No.: US 11,148,808 B2
(45) Date of Patent: Oct. 19, 2021

(54) DEVICE FOR AIRLIFTING AN OBJECT

(71) Applicant: AirRobot GmbH & Co. KG, Arnsberg (DE)

(72) Inventor: Burkhard Wiggerich, Arnsberg (DE)

(73) Assignee: AirRobot GmbH & Co. KG, Arnsberg (DE)

( * ) Notice: Subject to any disclaimer, the term of this patent is extended or adjusted under 35 U.S.C. 154(b) by 143 days.

(21) Appl. No.: 16/332,282

(22) PCT Filed: Sep. 15, 2017

(86) PCT No.: PCT/EP2017/073306
§ 371 (c)(1),
(2) Date: Mar. 11, 2019

(87) PCT Pub. No.: WO2018/050837
PCT Pub. Date: Mar. 22, 2018

(65) Prior Publication Data
US 2019/0202563 A1 Jul. 4, 2019

(30) Foreign Application Priority Data

Sep. 19, 2016 (DE) ..................... 10 2016 117 611.7

(51) Int. Cl.
*B64D 1/22* (2006.01)
*B64C 39/02* (2006.01)
(Continued)

(52) U.S. Cl.
CPC .................. *B64D 1/22* (2013.01); *B64C 1/22* (2013.01); *B64C 37/02* (2013.01); *B64C 39/024* (2013.01);
(Continued)

(58) Field of Classification Search
CPC ................ B64C 1/22; B64C 2201/027; B64C 2201/108; B64C 2201/128;
(Continued)

(56) References Cited

U.S. PATENT DOCUMENTS 3,366,347 A     1/1968  Soulez-Lariviere Jean
3,934,847 A  *  1/1976  Bentivegna .............. B64D 1/22
                                                244/137.2
(Continued)

FOREIGN PATENT DOCUMENTS

DE           1456061 A1    1/1970
DE      202015005962 U1    9/2015
(Continued)

OTHER PUBLICATIONS

International Search report dated Nov. 7, 2017 for corresponding PCT Application No. PCT/EP2017/073306.
(Continued)

*Primary Examiner* — Medhat Badawi
(74) *Attorney, Agent, or Firm* — Edell, Shapiro & Finnan, LLC

(57) ABSTRACT

A device for airlifting an object comprising a frame-like support structure. The support structure has an upper end region and a lower end region. The upper end region and the lower end region have at least partly corresponding shapes. The device further comprises a recess in which the object is arranged at least partly during airlifting.

7 Claims, 5 Drawing Sheets

(51) Int. Cl.
  *B64C 37/02* (2006.01)
  *B64C 1/22* (2006.01)
(52) U.S. Cl.
  CPC .. *B64C 2201/027* (2013.01); *B64C 2201/108* (2013.01); *B64C 2201/128* (2013.01); *B64C 2201/143* (2013.01); *B64C 2201/162* (2013.01)
(58) Field of Classification Search
  CPC ........ B64C 2201/143; B64C 2201/162; B64C 37/02; B64C 39/024; B64D 1/22
  See application file for complete search history.

(56) References Cited

U.S. PATENT DOCUMENTS

| | | | | |
|---|---|---|---|---|
| 7,946,530 | B1* | 5/2011 | Talmage, Jr. | B64C 37/00 244/118.2 |
| 9,171,479 | B2* | 10/2015 | Martin | G09B 9/08 |
| 9,277,130 | B2* | 3/2016 | Wang | H04N 5/3415 |
| 9,284,062 | B2* | 3/2016 | Wang | B60L 53/52 |
| 9,384,668 | B2* | 7/2016 | Raptopoulos | G06Q 10/083 |
| 9,387,928 | B1* | 7/2016 | Gentry | G08G 5/0052 |
| 9,457,899 | B2* | 10/2016 | Duffy | B64C 39/024 |
| 9,527,605 | B1* | 12/2016 | Gentry | B65G 43/00 |
| 9,764,836 | B1* | 9/2017 | Elzinga | B64C 39/024 |
| 9,845,165 | B2* | 12/2017 | Michalski | G08G 5/0026 |
| 9,878,787 | B2* | 1/2018 | Chan | B60L 53/126 |
| 9,957,045 | B1* | 5/2018 | Daly | B64C 37/02 |
| 10,310,501 | B2* | 6/2019 | Greenberger | G06Q 10/083 |
| 2004/0094662 | A1* | 5/2004 | Sanders, Jr. | B64C 27/20 244/12.5 |
| 2009/0146010 | A1* | 6/2009 | Cohen | B64D 1/22 244/137.1 |
| 2009/0250549 | A1* | 10/2009 | Wiggerich | B64C 39/028 244/17.11 |
| 2010/0012769 | A1* | 1/2010 | Alber | B64C 39/02 244/17.23 |
| 2014/0032034 | A1 | 1/2014 | Raptopoulos | |
| 2014/0037278 | A1* | 2/2014 | Wang | H04N 5/2328 396/55 |
| 2014/0111332 | A1* | 4/2014 | Przybylko | G08B 21/0269 340/539.1 |
| 2014/0217230 | A1* | 8/2014 | Helou, Jr. | B64C 39/024 244/17.17 |
| 2015/0175276 | A1* | 6/2015 | Koster | B64F 1/00 244/114 R |
| 2015/0331427 | A1* | 11/2015 | Chaudary | G05D 1/0858 244/17.13 |
| 2016/0001883 | A1* | 1/2016 | Sanz | H02J 7/0042 244/17.23 |
| 2016/0083115 | A1* | 3/2016 | Hess | B64C 39/022 701/3 |
| 2016/0107750 | A1* | 4/2016 | Yates | B64C 39/024 244/2 |
| 2016/0137304 | A1* | 5/2016 | Phan | B64C 39/024 244/17.23 |
| 2016/0144958 | A1* | 5/2016 | Woodworth | B64C 37/02 244/139 |
| 2016/0159496 | A1* | 6/2016 | O'Toole | B64D 1/12 244/110 E |
| 2016/0229530 | A1* | 8/2016 | Welsh | A63H 27/12 |
| 2016/0257423 | A1* | 9/2016 | Martin | B64F 1/00 |
| 2016/0286128 | A1* | 9/2016 | Zhou | B64C 39/024 |
| 2016/0304217 | A1* | 10/2016 | Fisher | B64F 1/222 |
| 2016/0355261 | A1* | 12/2016 | Chin | B64C 39/024 |
| 2016/0364989 | A1* | 12/2016 | Speasl | B64C 39/024 |
| 2016/0378108 | A1* | 12/2016 | Paczan | B64C 39/024 705/330 |
| 2017/0030715 | A1* | 2/2017 | Song | G01P 15/00 |
| 2017/0101177 | A1* | 4/2017 | Smirnov | B64C 39/028 |
| 2017/0183074 | A1* | 6/2017 | Hutson | B64C 1/061 |
| 2017/0225782 | A1* | 8/2017 | Kohstall | B64C 39/024 |
| 2017/0247109 | A1* | 8/2017 | Buchmueller | B64C 39/024 |
| 2017/0267345 | A1* | 9/2017 | Marom | B64C 39/02 |
| 2017/0313418 | A1* | 11/2017 | Yoon | B64C 27/20 |
| 2017/0320572 | A1* | 11/2017 | High | G05D 1/0011 |
| 2018/0147429 | A1* | 5/2018 | Won | B60F 5/02 |
| 2019/0016476 | A1* | 1/2019 | Scherz | B64F 1/364 |

FOREIGN PATENT DOCUMENTS

| | | |
|---|---|---|
| WO | 2014171998 A1 | 10/2014 |
| WO | 2015135951 A1 | 9/2015 |
| WO | 2015193742 A1 | 12/2015 |
| WO | 2016027942 A1 | 2/2016 |
| WO | 2016115574 A1 | 7/2016 |

OTHER PUBLICATIONS

Mike Murphy; "The first successful drone deliver in the US has taken place" Quartz; 4 pages, dated Jul. 20, 2015.
Box-o-copter!(Toolbox Quadcopter) Just fun www.flitetest.com; 3 pages, dated May 26, 2014.

* cited by examiner

DEVICE FOR AIRLIFTING AN OBJECT

FIELD OF THE INVENTION

The present invention relates to a device for airlifting an object. Devices of this kind can also be referred to as drones.

BACKGROUND

Devices of this kind to which an object can be fastened and then transported to a destination by means of said device are known from the prior art. The device in this case may, in particular, be remotely controllable in design, meaning that it can be controlled by a person on the ground.

SUMMARY OF THE INVENTION

By contrast, the problem addressed by the invention is that of creating a device for airlifting an object which can be arranged in a space-saving and stable manner via a further device of identical construction. Moreover, a system is to be created with a plurality of devices that can be stacked in a space-saving and stable manner.

This problem is solved by a device as disclosed herein and a system as disclosed herein. Embodiments of the invention are disclosed herein.

The device comprises a support structure with an upper and a lower end region. The support structure may have a frame-like design, for example, and carry multiple drive means of the device. The drive means may be configured so as to move the device in the air. The upper end region of the support structure in this case is understood to mean in the context of this description the end region of the device in particular which is oriented upwards during airlifting. The lower end region of the support structure is understood to mean in the context of this description the end region of the device in particular which is oriented downwards during airlifting.

The upper end region and the lower end region have at least partly corresponding shapes. The expression "at least partly corresponding shapes" in this case means that one of the end regions at least partly corresponds to an impression of the other end region, so that the upper end region of the device can engage in an at least partly form-fitting manner with the lower end region of a further device of identical construction when the two devices are positioned above one another. The at least partly corresponding shapes therefore mean that the device is stackable with other devices of identical construction.

It is also possible for the upper end region and the lower end region to have completely corresponding shapes. This endows the device with particularly simple and stable stackability with other devices identical in construction.

According to one embodiment of the invention, the upper end region may exhibit a shape which engages at least partly with the lower end region when there is a geometric projection beneath the lower end region. Alternatively or in addition, the upper end region may exhibit a shape with which the lower end region engages at least partly when there is a geometric projection beneath the lower end region.

A geometric projection in this case is understood to mean a purely theoretical displacement of the shape of the upper end region. With the geometrical projection of the shape of the upper end region beneath the lower end region, the shape of the upper end region is therefore theoretically displaced under the lower end region. The engagement of the shape of the upper end region with the lower end region or the lower end region with the shape of the upper end region is advantageous for a particularly simple and stable stacking of the device on another device identical in construction.

According to one embodiment of the invention, the lower end region may exhibit projections and the upper end region recesses. Alternatively or in addition, the upper end region may exhibit projections and the lower end region recesses. The recesses and projections in this case may have corresponding shapes and, in particular, be arranged above one another without lateral displacement. This may mean, in particular, that the projections are configured such that they project into recesses in a device of identical construction when the two devices are arranged one above the other.

It is also possible for the upper end region to have an at least partly outwardly oriented curvature and for the lower end region to have an at least partly inwardly oriented curvature. Alternatively, the upper end region may have an at least partly inwardly oriented curvature and the lower end region an at least partly outwardly oriented curvature. An inwardly oriented curvature in this case should be taken to mean that the end region concerned is curved in the direction of the other end region. An outwardly oriented curvature in this case should be taken to mean, in particular, that the end region concerned is curved away from the other end region. The outwardly oriented curvature may also be referred to as a convex curvature. The inwardly oriented curvature may also be referred to as a concave curvature.

Moreover, it is possible for the curvatures each to have the same radius of curvature. This is particularly advantageous for good stackability of multiple devices.

According to one embodiment of the invention, the device may exhibit a recess in which the object can be arranged at least partly during airlifting. Part of the object may therefore be arranged within the recess during airlifting, so that horizontal movements of the object are limited by the recess.

Moreover, it is possible for the object to be guidable through the recess. This is particularly advantageous if multiple devices are stacked one on top of the other so that the object can be moved from the bottom to the uppermost device.

According to one embodiment of the invention, the device may comprise a holding means. The object may be capable of being fastened to the holding means. In this way, the object can be held by the holding means during airlifting.

According to one embodiment of the invention, the holding means may be arranged above the recess. This means, in particular, that the holding means can be arranged above the recess during airlifting. Hence, the object can be held by the holding means and at the same time arranged in the recess.

According to one embodiment of the invention, the holding means may be retractable and extendible. This means that the device can be stored in a particularly space-saving manner when it is not required. Moreover, stackability is not detrimentally affected.

According to one embodiment of the invention, the device may comprise a protective means which can be fastened to the holding means and spread out over the device in the state fastened to the holding means. The protective means may comprise a tarpaulin, for example, which protects other components of the device and the object from weather influences.

According to one embodiment of the invention, the holding means may comprise a winch, a cable and a gripping element. The cable may be capable of being wound up and wound out by the cable winch. The gripping element may be arranged at one end of the cable and it may be configured to grip the object. The gripping element may be configured as pincers, for example, so that it can grip the object in a particularly secure manner.

Moreover, it is possible for the device to comprise a drive means for the cable winch, so that the cable can be wound up and wound out automatically, in order to raise or lower the object.

According to one embodiment of the invention, the device may comprise a clamping means which is designed to clamp the object in the recess. The clamping means may be elastically deformable, for example, so that the object is securely clamped in the recess. The clamping means may, in particular, comprise one or multiple balloon(s).

The system according to an embodiment comprises multiple devices for airlifting an object. It is possible, in particular, for the devices to be configured in such a manner as previously described for a single device. The devices are stackable. In the stacked state, the devices are connected to one another in a form-fitting manner. For example, the devices may be connected to one another by projections and recesses arranged above one another and engaged with one another. It is particularly possible that in the stacked state the uppermost of the devices can initiate the airlifting alone, in that it lifts up from the device arranged thereunder.

According to one embodiment of the invention, the system may comprise a motor vehicle which has an upwardly oriented recess. The devices may be arranged above the recess in such a manner that the recesses in the devices are arranged above the recess in the motor vehicle. In this way, the object can be guided from the motor vehicle upwardly through the recesses and transported by the uppermost device. This is particularly advantageous for package delivery services. The driver of the motor vehicle can reach a package upwards and secure it to the holding means of the uppermost device. The uppermost device can then airlift the package to its destination.

According to one embodiment of the invention, the motor vehicle may comprise a holding means which is configured to hold at least one of the devices in the position in which the recess in this at least one device is arranged above the recess in the motor vehicle. The holding means of the motor vehicle should not be confused with a holding means of one of the devices in this case. The holding means of the motor vehicle may be designed for a form-fitting connection to the lowermost of the devices, for example.

BRIEF DESCRIPTION OF THE DRAWINGS

Further features and advantages of the present invention are made clear with the help of the following description of preferred exemplary embodiments with reference to the accompanying drawings. In this case, the same reference numbers are used for the same or similar components and for components with the same or similar functions. In the drawings.

DETAILED DESCRIPTION OF THE INVENTION

Figure 1:
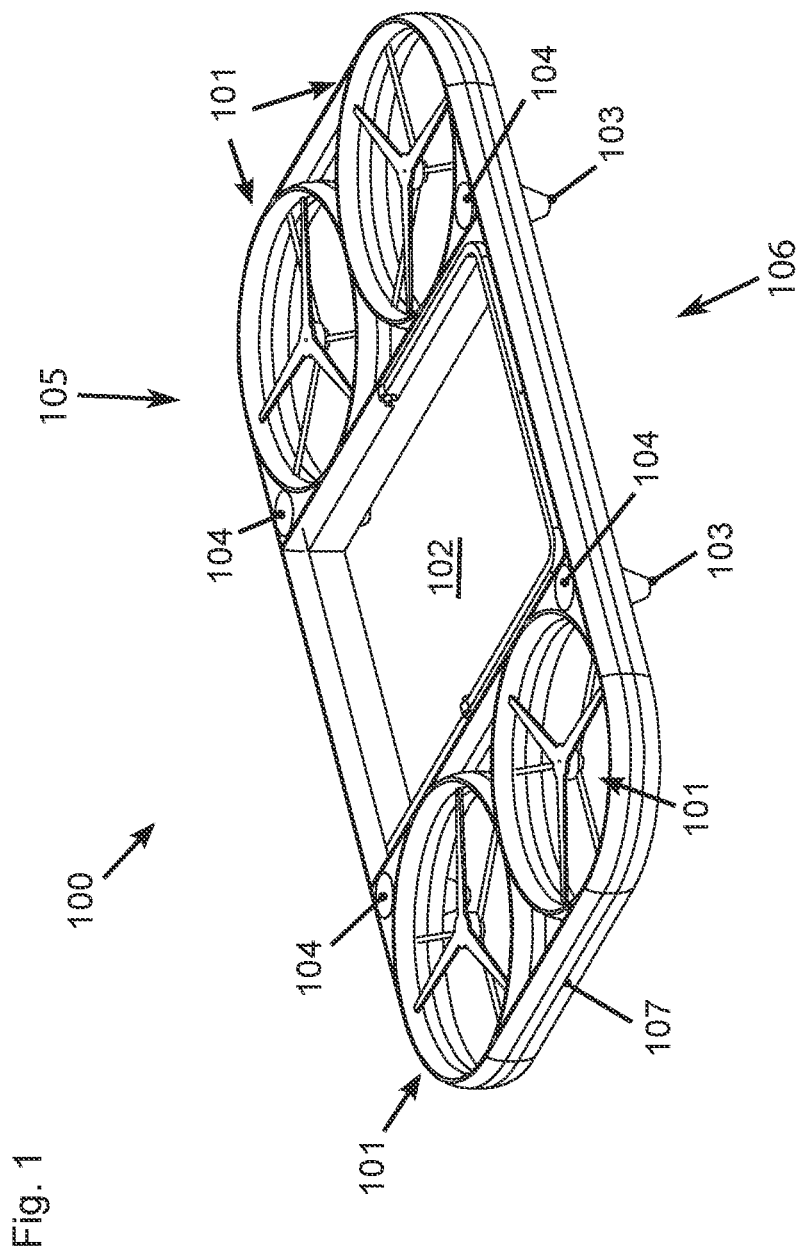
FIG. 1 shows a schematic perspective representation of a device according to one embodiment of the invention.

The device 100 depicted in FIG. 1 comprises a frame-like support structure 107, multiple drive means 101 and a recess 102. The frame-like support structure 107 has four downwardly projecting projections 103 in the lower end region 106. In the upper end region 105, the support structure 107 has four recesses 104. In this case, the recesses 104 are arranged over the projections 103 without lateral offset and the shapes of the recesses 104 and the projections 103 correspond, so that with an arrangement of a device of identical construction above or below the device 100 depicted in FIG. 1, the projections 103 of the one device engage with the recesses 104 in the other device and produce a form-fitting connection of the two devices to one another.

The recess 102 is arranged in the middle. This is particularly advantageous for the inflight stability of the device 100 when the device 100 is used to airlift an object which is arranged in the recess 102.

Figure 2:
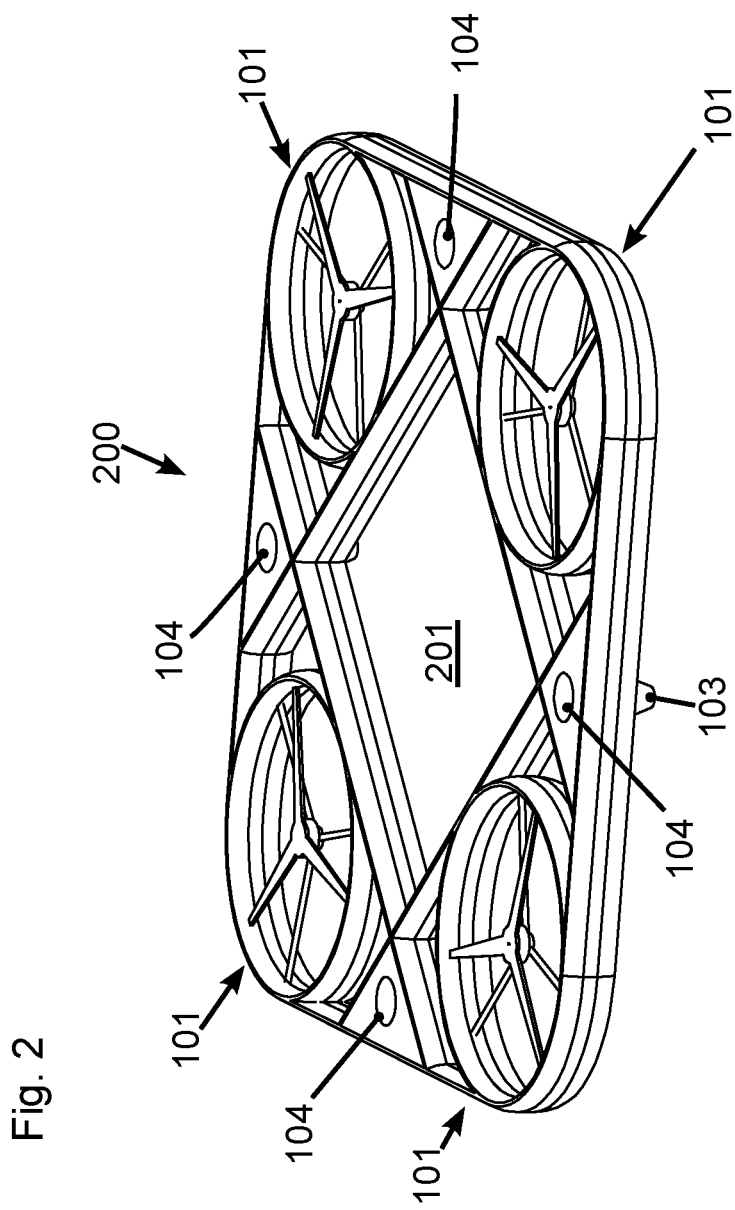
FIG. 2 shows a schematic perspective representation of a device according to a further embodiment of the invention.

An alternative device 200 which in principle performs the same functions as the device 100 from FIG. 1 is depicted in FIG. 2. The device 200 differs from the device 100 in particular due to the arrangement of the projections 103, the recesses 104 and the recess 201.

The recess 201 is likewise arranged in the middle but turned through approx. 45° by comparison with the recess 102. The projections 103 and the recesses 104 are each arranged at the middle of the respective sides of the support structure in the device 200. In the case of the device 100, two of the projections 103 and the recesses 104 are each arranged on the longitudinal sides of the support structure. Both in the case of the device 100 and also the device 200, the projections 103 and the recesses 104 are arranged at the corners of the recess 102 or 201.

Figure 3:
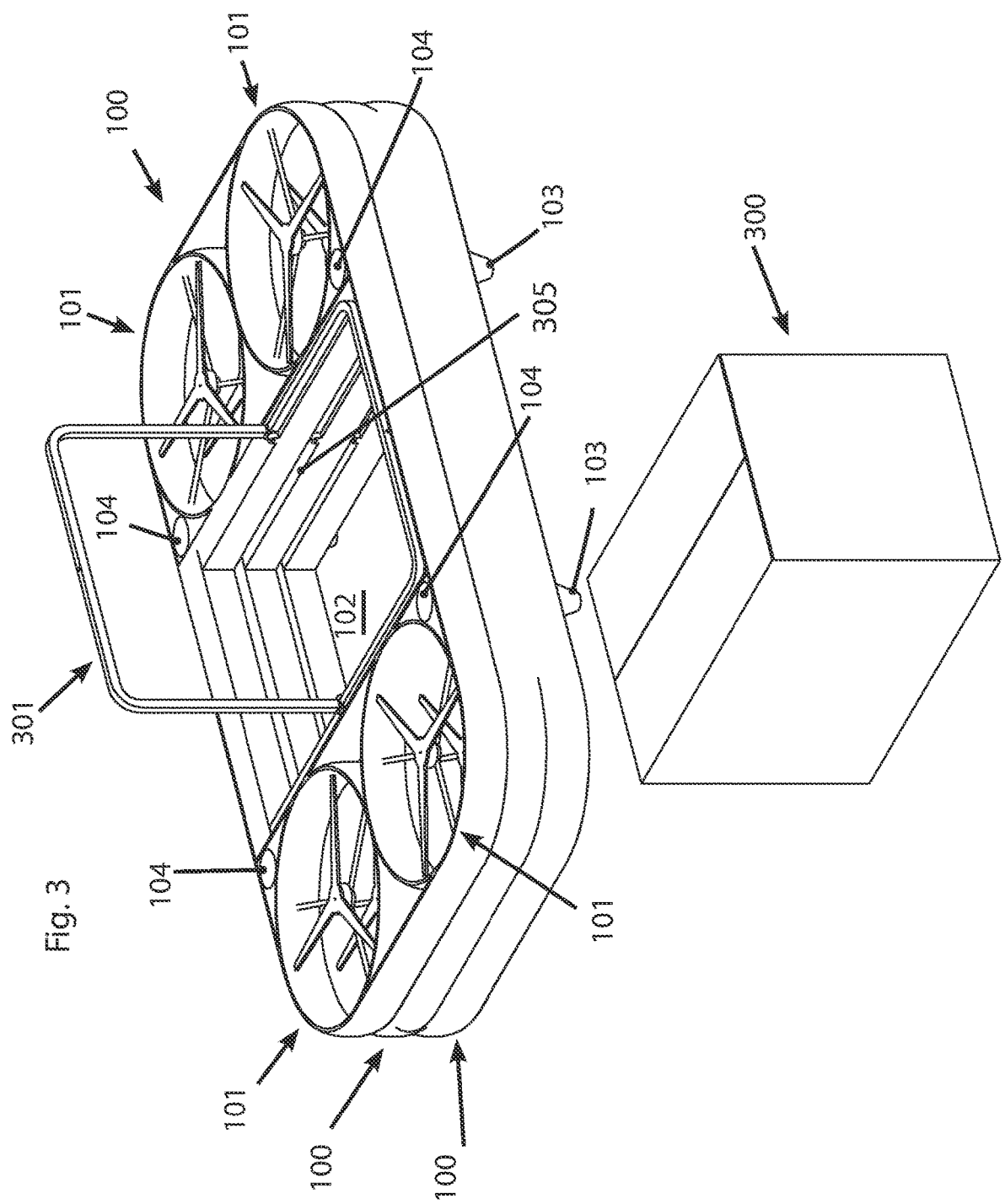
FIG. 3 shows a schematic perspective representation of a system with multiple devices from FIG. 1 and an object to be transported.

FIG. 3 shows how multiple devices 100 are stacked one on top of the other. This is made possible particularly easily and conveniently by the projections 103 and recesses 104. In the stacked state, the projections 103 of the uppermost device 100 project into the recesses 104 in the device 100 arranged therebelow. The projections 103 thereof likewise project into the recesses 104 in the lowermost device 100.

FIG. 3 moreover presents an extendible holding means 301 of the uppermost device 100 which is arranged above the recess 102 in the extended state. An object 300 which is to be airlifted using the device 100 can be fastened to this holding means 301. The holding means 301 of the two lower devices 100, on the other hand, are folded in for better stackability.

As further shown in FIG. 3, the device 100 may comprise a clamping means 305 that is designed to clamp object 300 in recess 102. More particularly, the clamping means 305 may be, for example, elastically deformable so that the object 300 is securely clamped in the recess.

Figure 4:
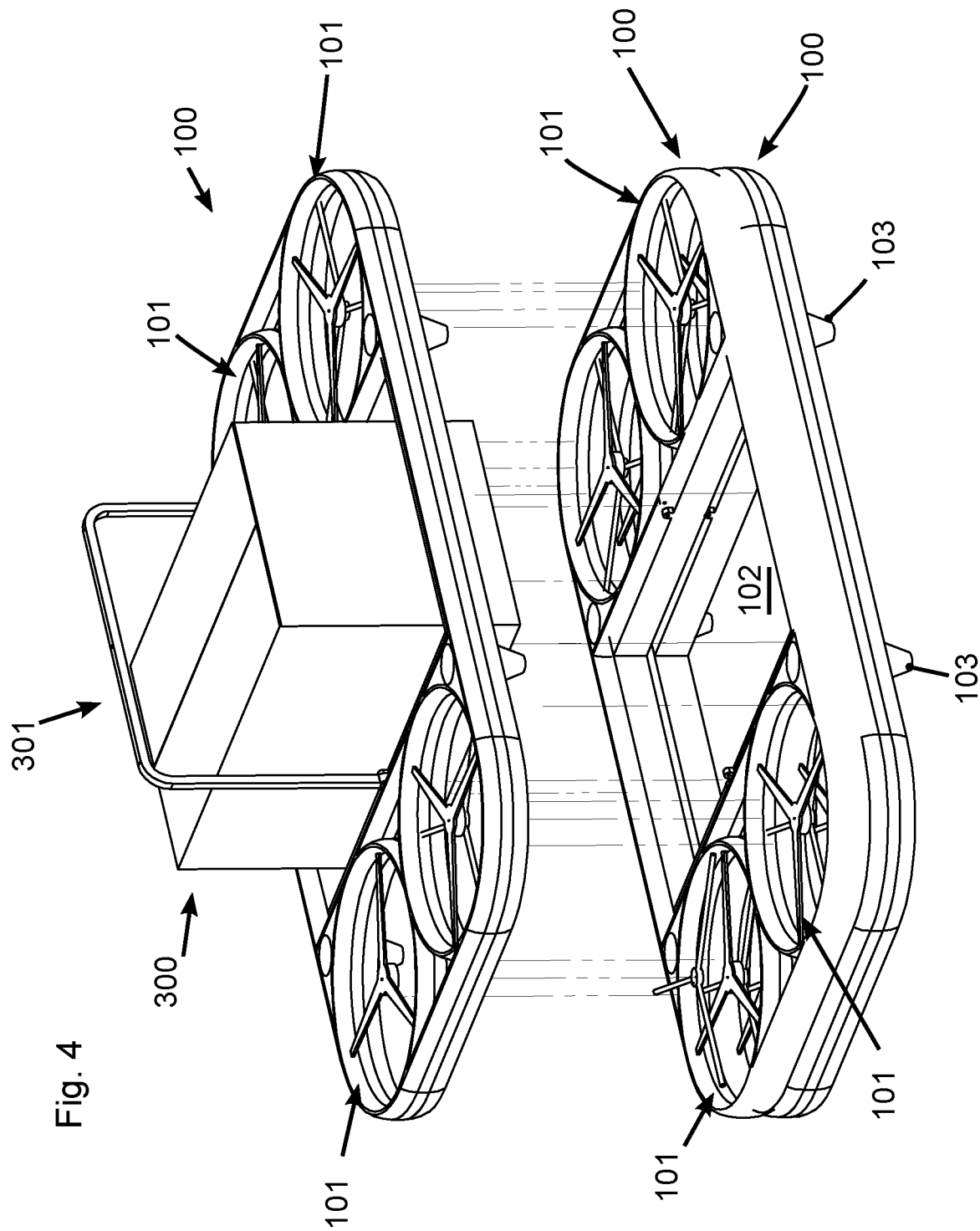
FIG. 4 shows a schematic perspective representation of the system from FIG. 3 with a raised device.

FIG. 4 shows how the uppermost device 100 is raised from the other two devices 100. Moreover, the object 300 to be transported is arranged within the recess 102 in the raised device 100. The object 300 can be fastened to the holding means 301, but this is not depicted in FIG. 4 for reasons of clarity. The object 300 can be transported to a destination by the uppermost device 100.

In order to airlift the object 300 using the uppermost device 100, the object 300 can be guided through the recesses 102 in the devices 100 depicted in FIG. 3 and fastened to the folded-out holding means 301 of the uppermost device 100. For example, the devices 100 may be arranged on the roof of a motor vehicle with a recess in the roof which is arranged directly below the recesses 102. A user can then guide the object 300 from the motor vehicle through the recess in the roof and the recesses 102 in the devices 100 and allow the uppermost device 100 with the object 300 fastened to the holding means 301 to be lifted. The next device 100 can then be used to transport a further object in a similar manner.

Figure 5:
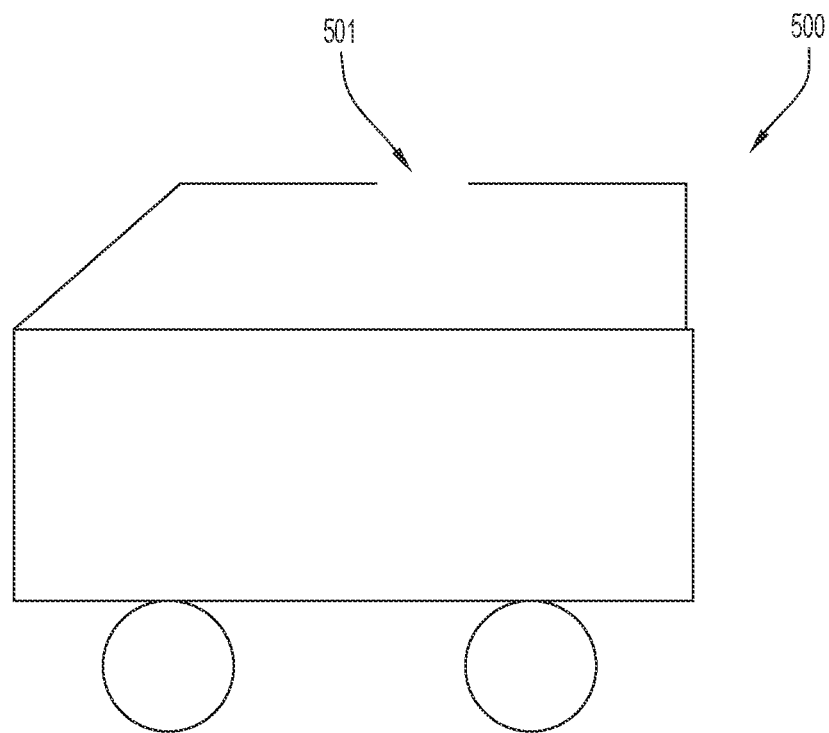
FIG. 5 shows a simplified side view of an example motor vehicle with an upwardly oriented recess according to an aspect of the invention.

Referring now to FIG. 5, the system may comprise a motor vehicle 500 which has an upwardly oriented recess 501. As described herein, the devices 100, 200 may be arranged above the recess 501 such a manner that the recesses 102, 201 in the devices are capable of being positioned above the recess 501 in the motor vehicle.

What is claimed is:

1. An airlift device for airlifting an object comprising: a support structure configured as a frame having two pairs of parallel, opposed sides, an upper end region, a lower end region, and a recess at a midportion of the frame in which the object is at least partly arranged during airlifting, wherein the upper end region and the lower end region have at least partly corresponding shapes, wherein the object is guidable through the recess, wherein the lower end region includes a plurality of projections and the upper end region includes a plurality of recesses or the upper end region includes a plurality of projections and the lower end region includes a plurality of recesses, wherein the recesses and the projections have corresponding shapes and are arranged adjacent the sides of the frame one above the other without lateral displacement, and wherein the upper end region has a shape configured to engage at least partly with a lower end region of a further airlift device of identical construction when the airlift devices are positioned above each other.

2. The airlift device of claim 1, wherein the device comprises a holding means, and the object is fastenable to the holding means.

3. The airlift device of claim 2, wherein the holding means is arranged above the recess.

4. The airlift device of claim 2, wherein the holding means is retractable and extendible.

5. The airlift device of claim 2, wherein the device comprises a clamping means configured to clamp the object in the recess.

6. A system comprising multiple airlift devices for airlifting an object according to claim 1, wherein the devices are stackable and, in a stacked state, the devices are connected to one another.

7. The system of claim 6, wherein the system comprises a motor vehicle, and wherein the motor vehicle includes an upwardly oriented recess above which the recesses in the devices are positioned.

* * * * *